United States Patent [19]

Nyc

[11] 4,068,539
[45] Jan. 17, 1978

[54] VARIABLE-RATIO TRANSMISSION

[76] Inventor: Wladimir Nyc, Jacksonville, Fla.

[21] Appl. No.: 625,632

[22] Filed: Oct. 24, 1975

[51] Int. Cl.² ............................................. F16H 55/54
[52] U.S. Cl. ............................. 74/230.18; 74/230.19; 74/230.23
[58] Field of Search ........... 74/230.16, 230.18, 230.19, 74/230.23, 244

[56] References Cited

U.S. PATENT DOCUMENTS

| 740,829 | 10/1903 | Dumaresq | 74/244 |
| 1,069,227 | 8/1913 | Church et al. | 74/230.23 |
| 2,196,402 | 4/1940 | Snyder | 74/230.19 |
| 3,867,851 | 2/1975 | Gregory et al. | 74/244 |
| 3,956,944 | 5/1976 | Tompkins | 74/230.23 |

FOREIGN PATENT DOCUMENTS

| 238,190 | 9/1911 | Germany | 74/230.23 |

Primary Examiner—Samuel Scott
Assistant Examiner—Allan R. Burke
Attorney, Agent, or Firm—George H. Baldwin; Arthur G. Yeager

[57] ABSTRACT

A transmission capable of providing an infinitely variable drive ratio between a predesigned minimum and maximum ratio, either automatically or manually variable.

19 Claims, 16 Drawing Figures

FIG 2

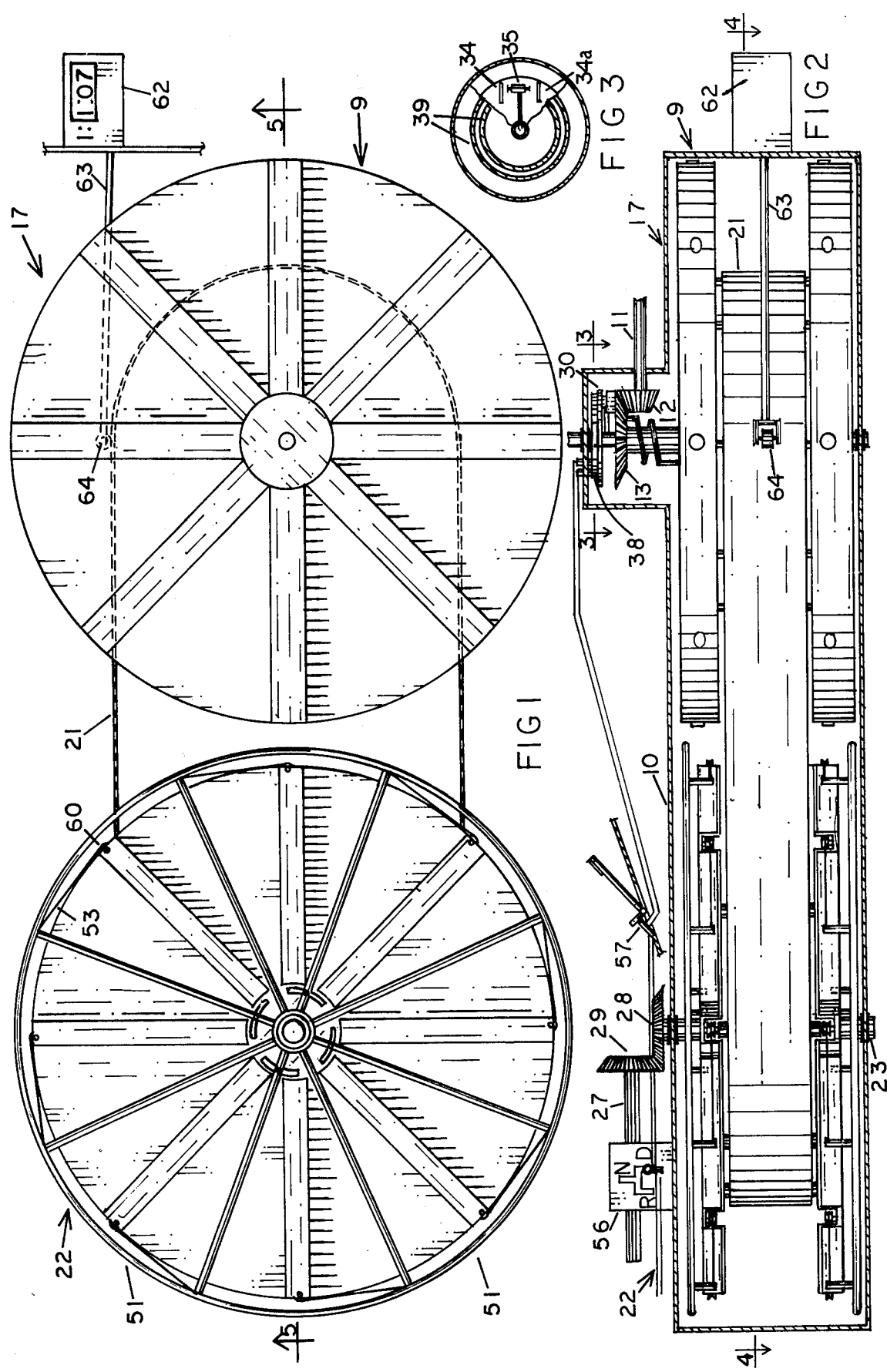

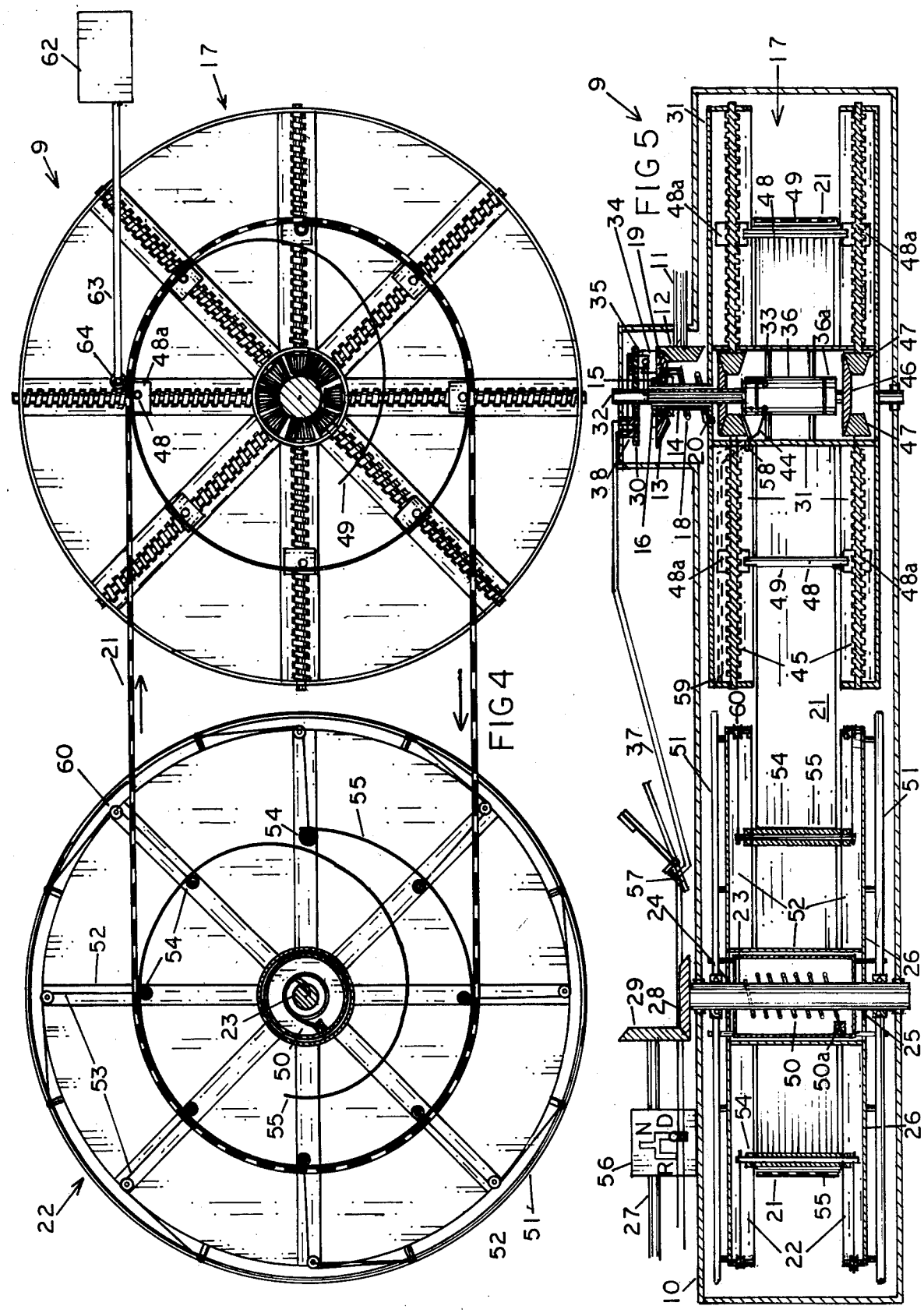

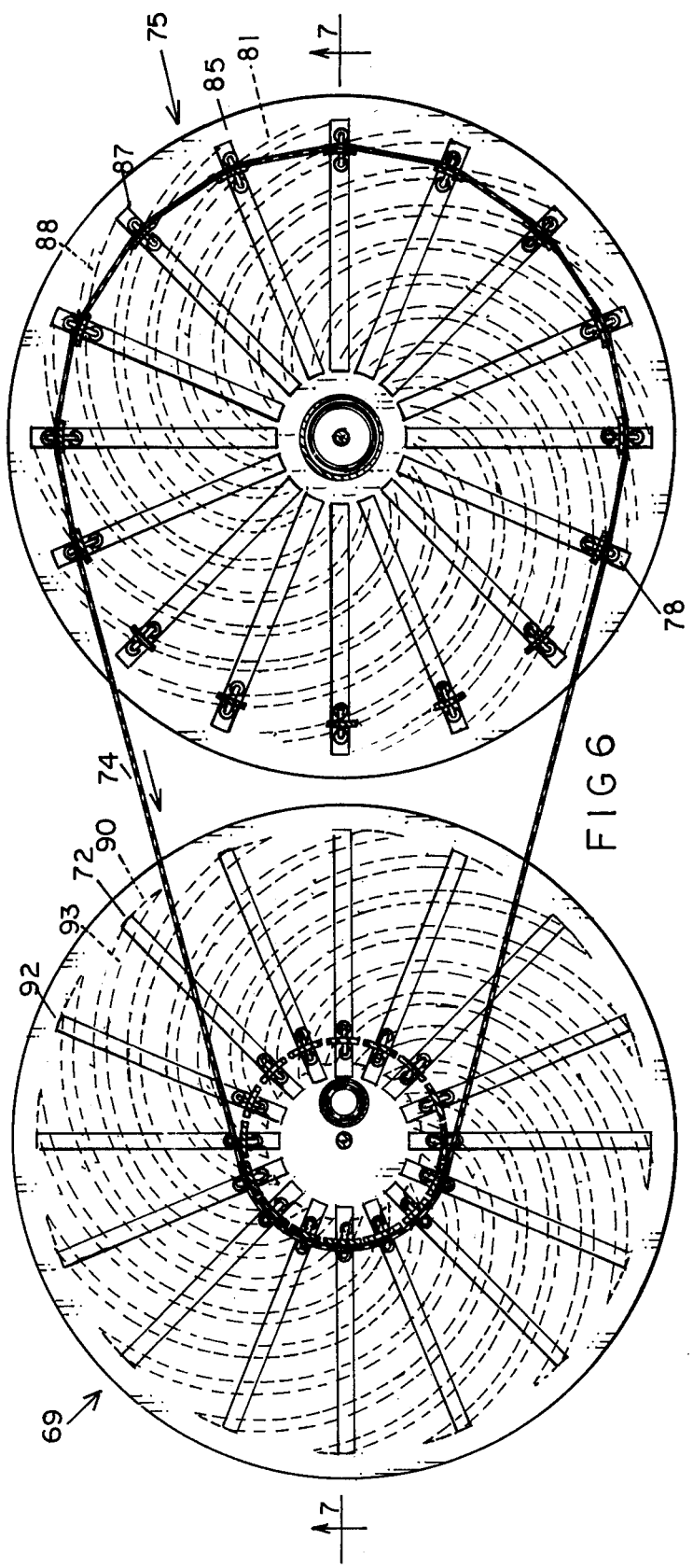
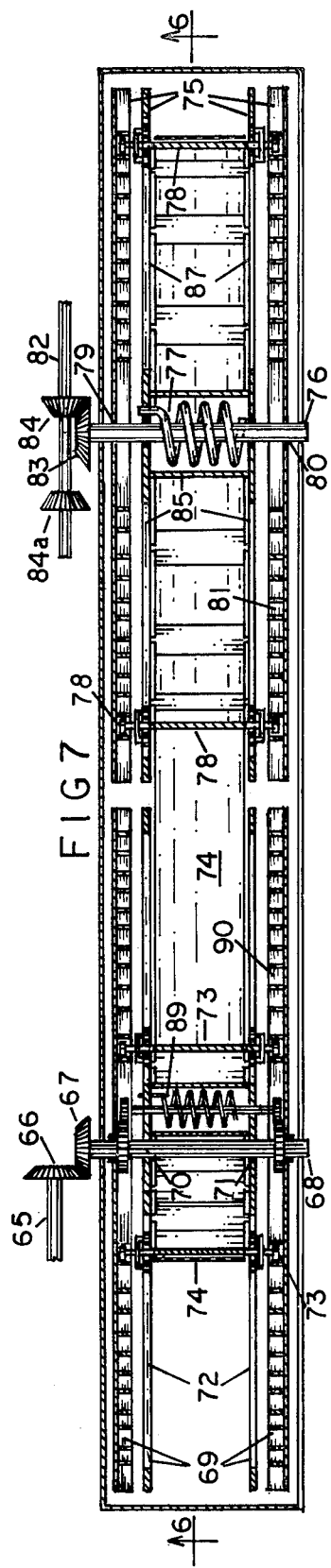

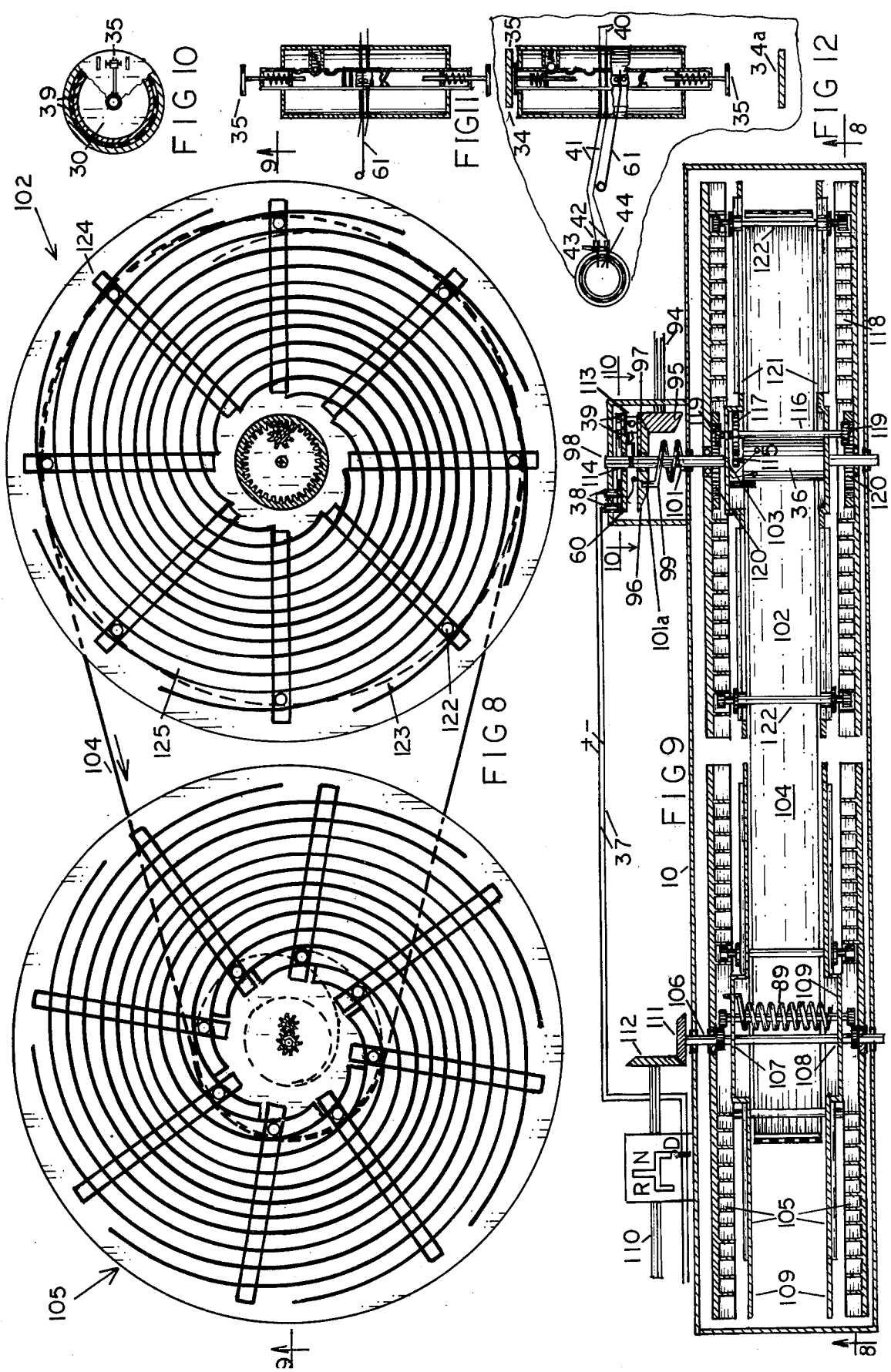

VARIABLE-RATIO TRANSMISSION

SUMMARY OF THE INVENTION

The invention relates in general to power transmission devices and particularly to variable drive ratio power transmission devices, both mechanical and electro-mechanical, and having either automatically changeable drive ratio means or manually changeable drive ratio means.

This variable drive ratio transmission device is unique in that it provides an infinitely variable drive ratio means between a wide range of predesigned minimum and maximum drive ratios, either automatically or manually.

It is the primary object of the invention to provide a device and method to change the drive ratio of a rotatable power source, more efficiently and over a wider range of drive ratios than other presently known devices.

It is also an object of the invention to provide a device and method to infinitely vary the drive ratio, smoothly and efficiently, between a predesigned minimum and maximum drive ratio.

It is another object of the invention to provide a device and method for more efficient transmission of a rotatable power source.

It is another object of the invention to provide a device and method for avoiding certain limitations inherent in prior applications of power transmission devices.

Other objects together with the foregoing are attained in the embodiments of the invention described in the accompanying description and illustrated in the accompanying drawings.

SHORT DESCRIPTION OF THE FIGURES

FIG. 1 is a top view of the variable ratio transmission, with portions broken away to reveal certain interior detail;

FIG. 2 is a side elevational view of the device of FIG. 1, with portions broken away to reveal certain interior detail;

FIG. 3 is a top fragmentary sectional view, to an enlarged scale, of a portion of the device of FIG. 2, the plane of the section being indicated by the lines 3—3 in FIG. 2;

FIG. 4 is a top sectional view of the device of FIG. 2, taken on the line 4—4 in FIG. 2;

FIG. 5 is a sectional view of the device of FIG. 1, taken on the line 5—5 in FIG. 1;

FIG. 6 is a top view of a slightly modified variable ratio transmission, with portions broken away to reveal certain interior detail;

FIG. 7 is a side elevational view of the device of FIG. 6;

FIG. 8 is a top view of a further modified variable ratio transmission, with portions broken away to reveal certain interior detail;

FIG. 9 is a side elevational view of the device of FIG. 8;

FIG. 10 is a top fragmentary sectional view, to an enlarged scale, of a portion of the device of FIG. 9, the plane of the section being indicated by the lines 10—10 in FIG. 9;

FIG. 11 is a fragmentary sectional view, to an enlarged scale, of a right hand portion of FIG. 10;

FIG. 12 is the same view as FIG. 11, with portions broken away to reveal certain interior detail;

DETAILED DESCRIPTION OF PREFERRED EMBODIMENT

Figure 13:
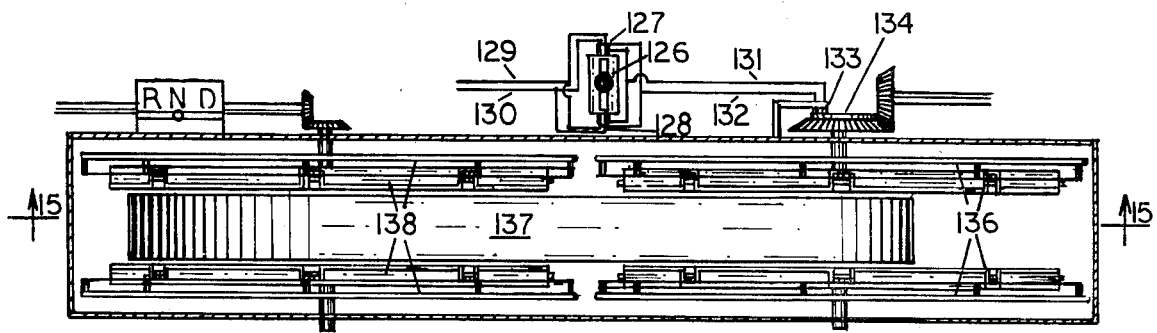
FIG. 13 is a side elevational of a further slightly modified variable ratio transmission.
Figure 14:
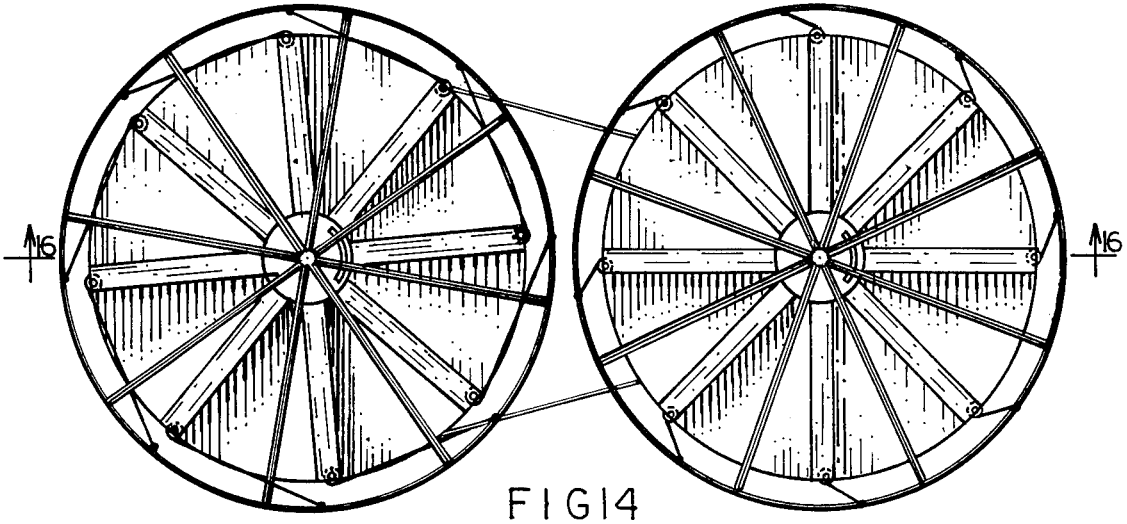
FIG. 14 is a top view of the device of FIG. 13.
Figure 15:
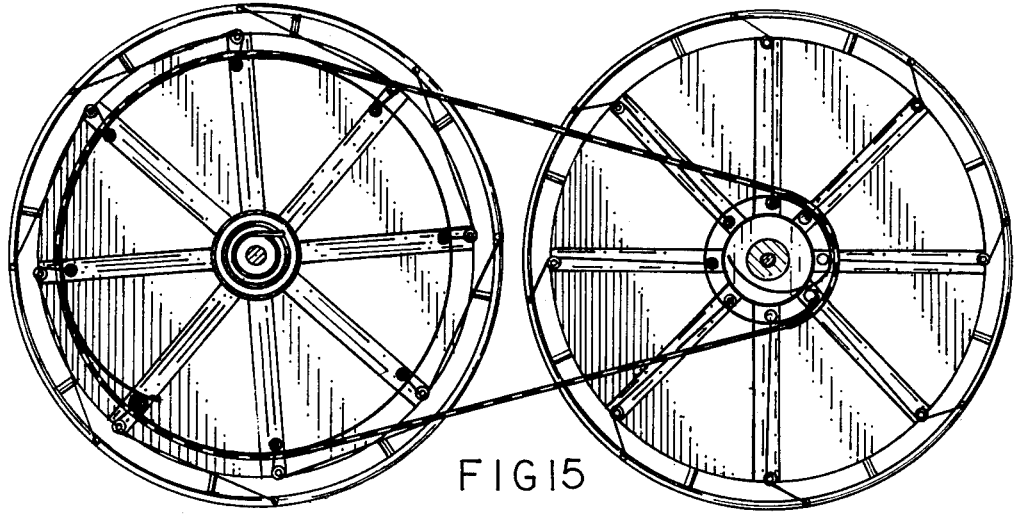
FIG. 15 is a top sectional view of the device of FIG. 13, taken on the line 15—15 in FIG. 13; and, FIG. 16 is a side elevational sectional view of the device of FIG. 14, taken on the line 16—16 in FIG. 14.

The variable ratio transmission of the invention, generally designated by the reference numeral 9 is enclosed within a suitable housing 10 which can also serve as a frame.

In the FIG. 1 – 5 form of transmission, a drive shaft 11, operated by a suitable power source such as an automobile engine or an electric motor, rotates bevel gear 12 which in turn rotates bevel gear 13 located on a first axis. Suitably mounted on anti-friction bearing 15, bevel gear 13 rotates axially about hollow cylindrical drum guide follower 14, and is fixed vertically by retainer flanges 16. First variable diameter belt drum 17 is rotated by bevel gear 13 through heavy coil spring 18 with rigid connections 19 and 20 to bevel gear 13 and first drum frame 31, respectively.

Friction belt 21, in direct rotation with first drum 17, or drive drum, provides similar axial rotation on a second axis of second varible diameter belt drum 22, or driven drum.

Second drum 22 rotates shaft 23 journaled on frame 10 through rigid connections 24 and 25 of second inner drum frame 26. Shaft 23, in turn, rotates driven shaft 27 through bevel gear 28 and bevel gear 29. The rotational energy of driven shaft 27 may be used to perform work and operate any desired equipment within the designed capacity.

Whenever driven shaft 27 is difficult to rotate and additional torque is required, drive drum 17 likewise requires a greater transfer of rotational energy from heavy coil spring 18. The increased force on spring 18 results in a slight winding or tightening of the spring coils, causing a slight angular displacement of bevel gear 13 relative to circular plate 30 rigidly connected to drive drum 17 through electric motor housing 32, electric motor mounts 33, and drum frame 31.

When tab 34, mounted on top of bevel gear 13, is displaced sufficiently to engage switch 35 (see FIG. 3), mounted on plate 30, switch 35 will activate electric motor 36. Power to operate electric motor 36 is provided through wires 37, brushes 38, conductive surfaces 39, wires 40, (see FIG. 12), switch 35, wires 41, brushes 42, conductive surfaces 43, and wires 44.

It should be noted that when switch 35 is engaged in the above manner, then, as shown in FIG. 12, the desired polarity of electric motor 36 is also attained. Switch positioning springs 61 and 62 insure a positive open or closed switch position to prevent unnecessary aging of electrical contacts.

Electric motor 36 rotates reduction gears 36a which, in turn, rotate worm gears 45 through bevel gears 46 and cone gears 47. This direction of rotation in worm gears 45 causes belt spring positioning bars 48 and attendant traveler blocks 48a in threaded engagement with the worn gears 45 to move inwardly, allowing first resilient belt spring 49, or band, to contract, resulting in a net decrease in the diameter of variable diameter belt drum 17. As shown in FIG. 4, one end of the band 49 is affixed to one of the traveler blocks 48. The remaining blocks 48 engage the band 49 in such a manner as to permit relative sliding movement of the overlapping band along its own length but control the radius of the band. The free end of the band 49 assumes a spiral shape, as appears most clearly in FIG. 4; and since the band is resilient, the circular portion of the band 49 which is in engagement with the friction belt 21 provides a variable diameter belt-driving surface, the diameter varying in dependence upon the radial location of the traveler blocks 48a.

The tension in friction belt 21 will momentarily decrease as the diameter of the band 49 diminishes, allowing coil spring 50 connected at one end to shaft 23 and at the other end to anchor 50a on spiderlike outer drum frame 51, to rotate spider 51 in a counter clockwise direction relative to inner drum frame 22, as viewed in FIG. 4. This relative differential rotation creates a relative angular displacement which allows wires 53 to pull radially translatable belt spring positioning bars 54 and second belt spring 55 or band, outwardly far enough to regain the designated tension in friction belt 21. The wires 53 are anchored at one end on the outer drum 51 and at the other end on bars 54, the wires passing over pulleys 60 as shown.

Now the diameter of belt drum 17 is smaller and the diameter of belt drum 22 is larger, thus gaining a greater mechanical advantage and a net increase of useful torque to driven shaft 27.

Whenever less torque is required and a higher speed of rotation in driven shaft 27 is desired, variable diameter belt drum 17 likewise requires a lesser transfer of rotational energy from heavy coil spring 18.

The decreased force on spring 18 results in a slight unwinding or expanding of the spring coils, causing a slight angular displacement of bevel gear 13 relative to circular plate 30. The direction of relative angular displacement is opposite to that discussed above in the case of increased power requirements.

When tab 34a, mounted on top of bevel gear 13, is displaced sufficiently to engage switch 35, mounted on plate 30, switch 35 will activate electric motor 36. It should be noted that when a switch 35 is engaged in this manner, the desired polarity of electric motor 36, opposite to that shown in FIG. 12, is attained.

Electric motor 36 rotates reduction gears 36a which in turn rotate worm gears 45 through bevel gears 46 and cone gears 47. This direction of rotation in worm gears 45 causes belt spring positioning bars 48 to move outwardly, causing first belt spring 49, or band, to expand, resulting in a net increase in the diameter of variable diameter belt drum 17. The tension in friction belt 21 will momentarily increase, causing coil spring 50 to rotate the spiderlike outer drum frame 51 in a clockwise direction relative to inner drum frame 52 as viewed in FIG. 4. This relative differential rotation results in a relative angular displacement which allows second resilient belt spring 55, or band, to contract thus pulling belt spring positioning bars 54 inwardly until the designed tension in friction belt 21 is re-established. Now the diameter of drive drum 17 is larger and the diameter of driven drum 22 is smaller, thus allowing an increased speed of rotation in driven shaft 27 and reducing the torque on the driven shaft 27 for the same power input to drive shaft 11.

In some applications of the variable-ratio transmission device, such as for an automobile, it may be desirable to install a selector switch 56 (see FIGS. 2 and 5), which would insure a constant ratio when the automobile transmission is in the neutral or reverse position. It may also be desirable to install an electro-mechanical switch 57, which would prevent a change in the transmission ratio each time the accelerator is released. It may also be desirable to install electric motor cutoff switches or limit switches, 58 and 59 on the inner and outer ends of worm gear 45, respectively, to prevent electric motor 36 from attempting to achieve a belt drum diameter either greater or smaller than the designed limit. Calibrated indicator box 62, with movable sensing arm 63, and wheel 64 engaging the belt 21 on a radius of the first circular band 49 indicates the ratio of belt drum 17 to that of belt drum 22.

From the foregoing, it can be seen that this variable ratio transmission device will effectively and automatically vary the drive ratio of a rotatable power source throughout a wide predesigned range of drive ratios to achieve the most efficient or most desirable speed and power of rotation. It can also be seen that variations to the diameter of variable diameter belt drum 17 occur only when a change in the power of rotation or when a change in the speed of rotation is desired. It can further be seen that variations to the diameter of variable diameter belt drum 22 occur only to regain the designed operating tension of friction belt 21, and that drum 22 is not directly sensitive to rotational power and rotational speed requirements.

An alternative structure and method of operation is disclosed in FIGS. 6 – 7. This modified form is similar to the previously described methods of operation and is described in detail as follows.

Drive shaft 65, operated by a suitable power source such as an electric motor, rotates bevel gear 66 which in turn rotates bevel gear 67. Bevel gear 67 rotates shaft 68 which, in turn, rotates a primary variable diameter drum generally designated by reference numeral 69, through rigid connections 70 and 71 to first inner drum frame 72, thence through primary friction belt positioning bars 73 to first outer drum frame 90.

Friction belt 74, in direct rotation with the inner drum frame 72 of the primary drum 69, provides similar axial rotation of a secondary variable diameter drum 75 comprising an outer drum frame 81 and an inner drum frame 85. Secondary drum 75 rotates shaft 76 through a heavy coil spring 77 secured at one end to shaft 76 and at the other end to second inner drum frame 85. A plurality of friction belt positioning bars 78 connects the drum frames 81 and 85 but allows relative angular displacement. Rigid connections 79 and 80 secure outer drum frame 81 to shaft 76.

Shaft 76 rotates driven shaft 82 through bevel gear 83 and bevel gear 84. The rotational energy of driven shaft 82 may be used to perform work and operate any desired equipment within the designed capacity.

Whenever driven shaft 82 is difficult to rotate and additional torque is required, variable diameter belt drum 75 likewise requires a greater transfer of rotational energy from heavy coil spring 77. The increased force on spring 77 results in a slight unwinding or expanding of the spring coils, causing a slight clockwise angular displacement of second inner drum frame 85 relative to second drum frame 81, as viewed in FIG. 6. This relative differential rotation continues, causing belt positioning bars 78, or blocks, to move radially outward along radial slots 87 in inner drum 85 and spiral slots 88 in outer drum 81, resulting in a net increase in the diameter of second variable diameter drum 75 until a sufficient power of rotation is available to shaft 82.

The tension in friction belt 74 will momentarily increase, allowing coil spring 89 to rotate first inner drum frame 72 in a counter clockwise direction relative to first outer drum frame 90, as viewed in FIG. 6. This relative differential rotation continues, causing belt positioning bars 73 to move radially inward along radial slots 92 in inner drum 72 and spiral slots 93 in outer drum 90, resulting in a net decrease in diameter of primary drum 69 until the designated tension in friction belt 74 is regained. Now the diameter of secondary drum 75 is larger and the diameter of primary drum 69 is smaller, thus gaining a greater mechanical advantage and a net increase of useful power to driven shaft 82.

Whenever less torque is required and a higher speed of rotation in driven shaft 82 is desired, secondary drum 75 correspondingly requires a lesser transfer of rotational energy from heavy coil spring 77. The decreased force on spring 77 results in a slight winding or tightening of the spring coils, causing a slight counter clockwise angular displacement of second inner drum frame 85 relative to second outer drum frame 81, as viewed in FIG. 6. This relative differential rotation continues, causing belt positioning bars 78 to move radially inward along radial slots 87 and spiral slots 88, resulting in a net decrease in the diameter of secondary drum 75 until the desired higher speed of rotation in driven shaft 82 is attained or until the designed force in heavy coil spring 77 is achieved.

The tension in friction belt 74 will momentarily decrease, allowing coil spring 89 to rotate first inner drum frame 72 in a clockwise direction relative to first outer drum frame 90, as viewed in FIG. 6. This relative differential rotation continues, causing belt positioned bars 73 to move radially outward along radial slots 92 and spiral slots 93, resulting in a net increase in the diameter of primary drum 69 until the designed tension in friction belt 74 is regained. Now the diameter of primary drum 69 is larger and the diameter of secondary drum 75 is smaller, thus allowing an increased speed of rotation in driven shaft 82 for the same power input to drive shaft 65.

A reversed direction of rotation for driven shaft 82 can be achieved by moving shaft 82 in a right hand direction as viewed in FIG. 7, until bevel gear 84 is disengaged and bevel gear 84a is engaged with bevel gear 83.

From the foregoing, it can be seen that this alternative device and method will also automatically vary the drive ratio of a rotatable power source throughout a wide, predesigned range of drive ratios to achieve the most efficient speed and power of rotation. As in the case of the previously described device, secondary variable diameter belt drum 75 changes diameter only when a change in the power of rotation or a change in the speed of rotation is needed. Likewise, variations to the diameter of primary drum 69 occur only to regain the designed operating tension of friction belt 74. No electric motor is required to vary the diameter of the belt drums in this alternative device.

Another alternative structure and method of operation is disclosed in FIGS. 8 – 9. This modified form in a combination of the previously described methods of operations and is described in detail as follows.

Drive shaft 94, operated by a suitable power source, rotates bevel gear 95 which in turn rotates bevel gear 96. Suitably mounted on anti-friction bearing 97, bevel gear 96 rotates axially about shaft 98. Shaft 98 is rotated by heavy coil spring 99 through rigid connections 101a on bevel gear 96 and 101 on shaft 98. Shaft 98, in turn, rotates variable diameter primary drum 102 through rigid connection 103. Friction belt 104, in direct rotation with primary drum 102, provides similar axial rotation of variable diameter secondary drum 105. Secondary drum 105 rotates shaft 106 through rigid connections 107 and 108, of secondary inner drum frame 109. Shaft 106 in turn rotates driven shaft 110 through bevel gear 111 and bevel gear 112. The rotational energy of shaft 110 may be used to perform work and operate any desired equipment within the designed capacity.

Whenever shaft 110 is difficult to rotate and additional power is required, variable diameter primary drum 102 likewise requires a greater transfer of rotational energy from heavy coil spring 99. The increased force on spring 99 results in a slight winding or tightening of the spring coils, causing a slight angular displacement of bevel gear 96, relative to circular plate 113. Suitably mounted on anti-friction bearing 114, circular plate 113 rotates axially about shaft 98. Drag springs 60 provide sufficient friction to dampen the free rotation of circular plate 113.

When tab 34, mounted on top of bevel gear 96, is displaced sufficiently to engage switch 35, mounted on plate 113, switch 35 will activate electric motor 36, in the manner discussed in detail above, to achieve the desired polarity of motor 36. Electric motor 36 rotates small gear 115 which in turn rotates shaft 116 through larger gear 117. Shaft 116 rotates outer drum frame 118 through spur gears 119 and ring gears 120, gears 120 being rigidly mounted on outer drum 118. Outer drum 118 is thus rotated in a clockwise direction relative to inner drum 121, as viewed in FIG. 8. This relative differential rotation continues, causing belt spring positioning bars 122 and belt springs 123 to move radially inward along slots 124 and spiral slots 125, resulting in a net decrease in the diameter of variable diameter belt drum 102. The tension in the friction belt 104 will momentarily decrease until the diameter of variable diameter secondary drum 105 increases sufficiently to regain the designed tension, as previously disclosed in FIG. 6 and described in detail above. Now the diameter of primary drum 102 is smaller and the diameter of secondary drum 105 is larger, thus gaining a greater mechanical advantage and a net increase of useful power to driven shaft 110.

Whenever less torque is required and a higher speed of rotation in shaft 110 is desired, variable diameter primary drum 102 likewise requires a lesser transfer of rotational energy from heavy coil spring 99. The decreased force on spring 99 results in a slight unwinding or expanding of the spring coils, causing a slight angular displacement of bevel gear 96, relative to circular plate 113. When tab 34a (see FIG. 12), mounted on top of bevel gear 96, is displaced sufficiently to engage switch 35, mounted on plate 113, switch 35 will activate electric motor 36, in the manner discussed in detail above, to achieve the desired polarity of motor 36. Electric motor 36 rotates small gear 115 which in turn rotates shaft 116 through larger gear 117. Shaft 116 rotates outer drum frame 118 through gears 119 and gears 120, gears 120 being rigidly mounted on outer drum frame 118. Outer drum 118 is thus rotated in a counter clockwise direction relative to inner drum frame 121, as viewed in FIG. 8. This relative differential rotation continues, causing belt spring positioned bars 122 and belt springs 123 to move radially outward along slots 124 and spiral slots 125, resulting in a net increase in the diameter of variable diameter belt drum 102. The tension in friction belt 104 will momentarily increase until the diameter of variable diameter belt drum 105 decreases sufficiently to regain the designed tension, as previously disclosed in FIG. 6 and described in detail above. Now the diameter of primary drum 102 is larger and the diameter of secondary drum 105 is smaller, thus allowing an increased speed of rotation in shaft 110 for the same power input to shaft 94.

From the foregoing it can be seen that this alternative device and method will also automatically vary the drive ratio of a rotatable power source throughout a wide predesigned range of drive ratios to achieve the most efficient speed and power of rotation. As in the case of the previously described device, variable diameter primary drum 102 changes diameter only when a change in the power of rotation or a change in the speed of rotation is needed. Likewise, variations to the diameter of variable diameter secondary drum 105 occur only to regain the designed operating tension of friction belt 104.

FIGS. 13 – 16 illustrate that numerous other combinations of the previously disclosed devices can also be used to achieve a variable ratio-transmission device to efficiently vary the drive ratio of a rotatable power source throughout a wide, predesigned range of drive ratios.

Figure 16:
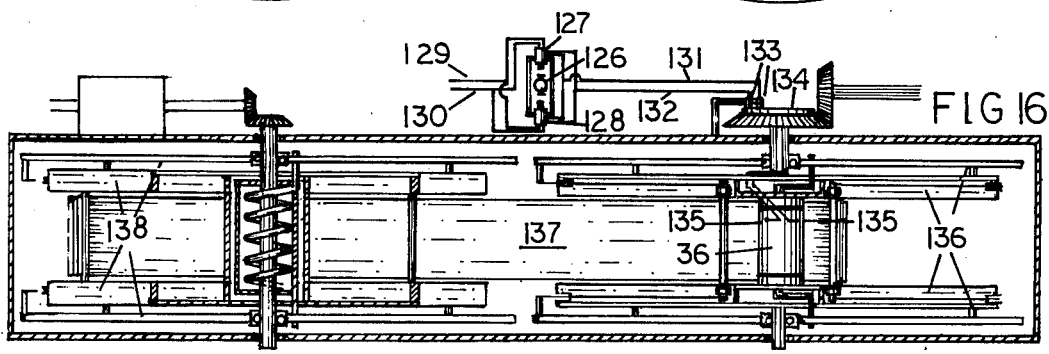

FIG. 16 further discloses a modified structure and method of operation whereby any desired drive ratio, falling within a designed range of drive ratios, may be selected manually. The selected drive ratio will remain constant until a different drive ratio is manually selected. If an increased power of rotation is desired, switch lever 126 is manually raised, engaging switch 127, thereby activating electric motor 36, and achieving the desired polarity of motor 36 through wires 129, 130, switch 127, wires 131, 132, brushes 133, conductive surfaces 134, and wires 135. The resulting direction of rotation in motor 36 will cause a net decrease in the diameter of variable diameter belt drum 136. When the diameter of belt drum 136 decreases, the tension in friction belt 137 will momentarily decrease. Variable diameter belt drum 138, responsive to the change in belt tension, will increase in diameter until the designed operating tension in friction belt 137 is regained. Now the diameter of belt drum 136 is smaller and the diameter of belt drum 138 is larger, thus providing a greater mechanical advantage and a net increase in useful power output. If an increase in the speed of rotation is desired, switch lever 126 is manually lowered, engaging switch 128, thereby activating electric motor 36, and achieving the desired polarity of motor 36 through wires 129, 130, switch 128, wires 131, 132, brushes 133, conductive surfaces 134, and wires 135. The resulting direction of rotation in motor 36 will cause a net increase in the diameter of variable diameter belt drum 136. When the diameter of belt drum 136 increases, the tension in friction belt 137 will momentarily increase. Variable diameter belt drum 138, responsive to the change in belt tension, will decrease in diameter until the designed operating tension in friction belt 137 is regained. Now the diameter of belt drum 136 is larger and the diameter of belt drum 138 is smaller, thus providing a higher speed of rotational output.

Other variations to the automatic switch devices described above could be achieved by utilizing such well-known devices as centrifugal cut-out switches, and vacuum-activated cut-out switches.

From the foregoing, it can be seen that this variable ratio transmission device may be used to efficiently change the drive ratio, manually or automatically, of a rotatable power source. It can also be seen that the device provides an infinitely variable drive ratio means between a wide range of predesigned minimum and maximum drive ratios.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling into the scope of the invention as claimed.

What is claimed is:

1. A transmission connecting a drive shaft to a driven shaft having variable requirements to torque and speed, said transmission comprising:
   a. a frame;
   b. a first drum rotatably mounted on said frame for rotation about a first axis;
   c. first means for connecting said drive shaft and said first drum;
   d. a first substantially circular resilient band mounted coaxially on said first drum for radial expansion and contraction;
   e. a second drum rotatably mounted on said frame for rotation about a second axis;
   f. second means for connecting said second drum and said driven shaft;
   g. a second substantially circular resilient band mounted coaxially on said second drum for radial expansion and contraction;
   h. an endless belt connecting said first circular band and said second circular band, said belt being effective to transfer power from said drive shaft and said first drum to said second drum and said driven shaft;
   i. said first means for connecting said drive shaft and said first drum including spring means connected therebetween for transferring power from said drive shaft to said first drum and yieldable in response to change in torque transmitted therethrough thereby to permit limited relative angular displacement between said drive shaft and said first drum, and
   j. means responsive to such displacement to vary the diameter of said first circular band.

2. A transmission as in claim 1 in which said first means for connecting said drive shaft and said first drum includes a first axle journaled on said frame and carrying said first drum; a cylindrical extension mounted on said first drum, the axis of said extension being coincident with said first axis; a first bevel gear journaled on said extension, said first bevel gear being in driven engagement with said drive shaft; and said spring means is engaged between said first bevel gear and said first drum for transferring power from said drive shaft to said first drum.

3. A transmission as in claim 2 in which said means for varying the diameter of said first circular band includes a plurality of worm gears radially mounted on said first drum; a plurality of traveler blocks threadably engaged with said worm gears and located equidistant from said first axis, said traveler blocks moving radially outwardly and inwardly in response to rotation of said worm gears to maintain equal distances from said first axis; means for connecting said first circular band to said traveler blocks so that the diameter of said first circular band is established by the radial location of said traveler blocks, with said diameter of said first circular band increasing and decreasing in response to the radial movements of said traveler blocks; and means responsive to said angular displacement for rotating said worm gears in unison to effect uniform radial movement of said traveler blocks.

4. A transmission as in claim 3 in which said worm gear rotating means includes an electric motor mounted on said first drum; and switch means for controlling the operation of said electric motor, said switch means being actuated by said relative angular displacement between said first bevel gear and said first drum.

5. A transmission as in claim 4 in which said switch means includes a plate coaxially mounted on said drum extension parallel to and adjacent said bevel gear, said plate rotating in unison with said first drum and said first bevel gear rotating at an angular velocity determined by the angular velocity of said drive shaft; first electrical contact means mounted on said plate; and second electrical contact means mounted on said first bevel gear, said first electrical contact means and said second electrical contact means actuating said motor by engagement between said first and second contact means as the angular velocity of said first drum and said plate is temporarily changed relative to the angular velocity of said drive shaft and said first bevel gear.

6. A transmission as in claim 5 in which said second means for connecting said second drum and said driven shaft includes a second shaft journaled on said frame coincident with said second axis; a bevel gear mounted on said second shaft, said bevel gear being in driving engagement with said driven shaft; and means for mounting said second drum on said second shaft for rotation in unison therewith.

7. A transmission as in claim 6 in which said means for varying the diameter of said second circular band includes a spider journaled on said second shaft; second spring means engaging said second drum and said spider, said second spring means being mounted to rotate said spider and permit limited relative angular displacement between said second drum and said spider; a plurality of positioning bars translatably mounted on said second drum for radial movement; means for connecting said second circular band to said positioning bars, said second circular band having an inward urgency and including an overlapping portion enabling the diameter of said second circular band to increase and decrease in response to the radial movements of said positioning bars; and means connecting said spider and said positioning bars for radially translating said positioning bars in response to relative angular displacement between said second drum and said spider.

8. A transmission as in claim 7 in which said positioning bar translating means includes a plurality of flexible wires anchored at one end on said spider and at the other end on said positioning bars; and a corresponding plurality of pulleys located on radii including said positioning bars, said pulleys being effective to align said wires so as to urge said bars radially outwardly in opposition to said inwardly urgent second band as said second drum and said spider are angularly displaced in a first direction, said wires permitting said second circular band to urge said positioning bars radially inwardly as said second drum and said spider are angularly displaced in a second relative angular direction opposite to said first angular direction.

9. A transmission as in claim 8 including an electrical limit switch on at least one of said worm gears for restricting the extent of radial movement of said traveler blocks.

10. A transmission as in claim 8 including an electrical selector switch interposed in the electrical circuitry of said motor, said selector switch being mechanically connected to the gear shift mechanism of a vehicle and being effective to disable the electrical motor circuit when the vehicle's gear shift mechanism is in neutral or reverse mode.

11. A transmission as in claim 8 including a disabling switch mechanically connected to the accelerator of a vehicle and electrically connected to the electrical circuitry of said worm drive motor, said disabling switch preventing actuation of said motor each time the accelerator is released.

12. A transmission as in claim 8 including an indicator having a sensing arm; and a wheel on the distal end of said arm in engagement with said belt on a radius of said first circular band, said indicator being calibrated to indicate the ratio of diameters of said first circular band and said second circular band.

13. A transmission as in claim 1 and an outer drum coaxial with said first drum, and wherein said drive shaft is drivingly connected to said outer drum, said spring means being connected between said first drum and said outer drum, said first drum being provided with a plurality of radial guides, and wherein said means responsive to such displacement to vary the diameter of said first circular band comprises a plurality of radial guides on said outer drum, a plurality of primary positioning blocks each in engagement with respective adjacent ones of said spiral guides and said radial guides for movement along said guides radially inwardly toward and outwardly from the axis of said first drum in response to said relative angular displacement, said first resilient band being connected to said blocks for expansion and contraction with such radial outward and inwardly movement thereof.

14. A transmission as in claim 1 wherein said last means comprises a first set of radial guides and a second set of relatively angularly displaceable spiral guides coordinated with said first set, one of said sets being connected for rotation to said shaft and the other being connected for rotation to said band, and a plurality of gude followe elements, each said element following one guide and of said first set and a corresponding guide of said second set, said follower elements being connected to said first band.

15. A transmission as in claim 1 in which said means for varying the diameter of said first circular band includes a manually operated two-way electical switch; an electrical motor mounted on said first drum rotation therewith; and gear means connecting said electrical motor and said first circular band for radially contracting and expanding said first circular band in response to said switch means.

16. A transmission connecting a drive shaft to a driven shaft having variable load requirements of torque and speed, said transmission comprising:
  a. a frame;
  b. a first drum mounted on said frame for rotation about a first axis;
  c. a drive shaft d. a torque transmitting spring drivingly connecting said drive shaft to said first drum;
e. a second drum mounted on said frame for rotation about a second axis parallel to said first axis;
f. a plurality of primary positioning members movable mounted on said first drum equidistant from said first axis and being movable toward and away from said first axis;
g. a plurality of secondary positioning members movably mounted on said second drum equidistant from said second axis and being movable toward and away from said second axis;
h. resilient means urging said secondary positioning members outwardly from said second axis;
i. an endless belt trained over and frictionally engaging said primary positioning members and said secondary members, said belt being effective to transfer power from said drive shaft and said first drum to said second drum and said driven shaft; and
j. means responsive to angular displacement between said drive shaft and said first drum resulting from variable load demands for changing the diameter of the first circle formed by said primary positioning members and being responsive to an increase in such torque to decrease the diameter of said circle, the diameter of the second circle of the secondary positioning members increasing under the influence of said resilient means in response to the reduction of belt tension resulting from such decrease in diameter of said first circle.

17. A transmission as in claim 16 wherein said first drum is provided with means for guiding said primary positioning members radially inwardly and outwardly thereof, and wherein said drive shaft carries spiral guide means extending spirally outwardly from the axis of said drive shaft and adjacent said guiding means of said first drum, said primary positioning members being engaged with said spiral guide means for movement therealong in response to said angular displacement.

18. A transmission connecting a drive shaft to a driven shaft having variable requirements of torque and speed, said transmission comprising:
a. a frame;
b. a primary drum rotatably mounted on said frame for rotation about a primary axis, said primary drum including a first outer drum having a plurality of spiral slots formed therein and a first inner drum having a plurality of radial slots formed therein;
c. means for connecting said drive shaft and said primary drum;
d. primary spring means connecting said first outer drum and said first inner drum for transferring power therebetween and allowing limited relative angular displacement between said first outer drum and said first inner drum;
e. a plurality of primary positioning blocks equidistant from said primary axis and disposed in respective adjacent ones of said spiral slots and said radial slots for movement along said slots in response to relative angular displacement between said first outer drum and said first inner drum;
f. a secondary drum rotatably mounted on said frame for rotation about a secondary axis said secondary drum including a second external drum having a plurality of spiral slots formed therein and a second internal drum having a plurality of radial slots formed therein;
g. means for connecting said secondary drum and said driven shaft;
h. secondary spring means connecting said second internal drum and said second external drum for transferring power therebetween and allowing limited relative angular displacement between said second internal drum and said second external drum;
i. a plurality of second positioning blocks equidistant from said secondary axis and disposed in respective adjacent ones of said spiral slots and said radial slots for movement along said slots by an amount related to the extent of relative angular displacement between said second external drum and said second internal drum;
j. an endless belt connecting said primary drum and said secondary drum, said belt frictionally engaging said primary positioning blocks and said secondary positioning blocks, the linear speed of said belt relative to the rotational speed of said drive shaft being responsive to changes in the diameter of the circle formed by said equidistant positioning blocks in said primary drum responsive to the torque applied through said primary spring means and the rotational speed of said secondary drum relative to the linear speed of said belt being responsive to changes in the diameter of the circle formed by said positioning blocks in said secondary drum responsive to the tension applied by the power-transmitting tensioned run of said belt.

19. A transmission as in claim 18 including an electric motor; electrical switch means interposed between said drive shaft and said primary drum, said switch means being effective to sense changes in relative speed between said drive shaft and said primary drum, said switch means being effective to actuate said electric motor; and gear means connecting said electric motor and said first inner drum for urging said positioning blocks in a radial direction in dependence upon the direction of angular displacement between said first inner drum and said first outer drum.

* * * * *